(12) United States Patent
Choi et al.

(10) Patent No.: US 11,537,881 B2
(45) Date of Patent: Dec. 27, 2022

(54) MACHINE LEARNING MODEL DEVELOPMENT

(71) Applicant: THE BOEING COMPANY, Chicago, IL (US)

(72) Inventors: Jai Choi, Sammamish, WA (US); Zachary Jorgensen, Parker, CO (US); Dragos Margineantu, Bellevue, WA (US); Tyler Staudinger, Parker, CO (US)

(73) Assignee: The Boeing Company, Chicago, IL (US)

( * ) Notice: Subject to any disclaimer, the term of this patent is extended or adjusted under 35 U.S.C. 154(b) by 678 days.

(21) Appl. No.: 16/659,013

(22) Filed: Oct. 21, 2019

(65) Prior Publication Data

US 2021/0117774 A1 Apr. 22, 2021

(51) Int. Cl.
| | |
|---|---|
| *H04N 19/30* | (2014.01) |
| *G06N 3/08* | (2006.01) |
| *G06N 3/04* | (2006.01) |
| *G10L 15/10* | (2006.01) |
| *G06T 9/00* | (2006.01) |

(52) U.S. Cl.
CPC ............. *G06N 3/08* (2013.01); *G06N 3/0454* (2013.01); *G06T 9/002* (2013.01); *G10L 15/10* (2013.01); *H04N 19/30* (2014.11)

(58) Field of Classification Search
CPC .......... H04N 19/30; G06T 9/002; G10L 15/10
See application file for complete search history.

(56) References Cited

U.S. PATENT DOCUMENTS

| | | | |
|---|---|---|---|
| 6,574,754 B1* | 6/2003 | Smith .................... | G11B 27/36 706/26 |
| 2005/0049860 A1* | 3/2005 | Junqua .................... | G10L 15/22 704/E15.04 |

(Continued)

OTHER PUBLICATIONS

Linden et al., "Inversion of multilayer nets," Proc. Int. Joint Conf. Neural Networks, vol. II, 1989, pp. 425-430.

(Continued)

*Primary Examiner* — Feng-Tzer Tzeng
(74) *Attorney, Agent, or Firm* — Womble Bond Dickinson (US) LLP

(57) ABSTRACT

A method of machine learning model development includes building an autoencoder including an encoder trained to map an input into a latent representation, and a decoder trained to map the latent representation to a reconstruction of the input. The method includes building an artificial neural network classifier including the encoder, and a classification layer partially trained to perform a classification in which a class to which the input belongs is predicted based on the latent representation. Neural network inversion is applied to the classification layer to find inverted latent representations within a decision boundary between classes in which a result of the classification is ambiguous, and inverted inputs are obtained from the inverted latent representations. Each inverted input is labeled with a class that is its ground truth, and thereby producing added training data for the classification, and the classification layer is further trained using the added training data.

21 Claims, 4 Drawing Sheets

(56) References Cited

U.S. PATENT DOCUMENTS

| | | | | |
|---|---|---|---|---|
| 2016/0140111 A1* | 5/2016 | Mirkin | .................... | G06F 40/58 |
| | | | | 704/2 |
| 2020/0029084 A1* | 1/2020 | Wierstra | ................ | H04N 19/30 |
| 2020/0265318 A1* | 8/2020 | Malkiel | .................. | G06N 3/088 |
| 2022/0076131 A1* | 3/2022 | Rolfe | .................. | G06N 3/0472 |

OTHER PUBLICATIONS

Jensen et al, "Inversion of feedforward neural networks: algorithms and applications", Proc. of the IEEE, vol. 87, No. 9, 1999, pp. 1536-1549.

Masci et al., "Stacked convolutional auto-encoders for hierarchical feature extraction," ICANN, 2011, pp. 52-59.

Lecun et al., "Deep learning," Nature, 521(7553), 2015, pp. 436-444.

Mikolajczyk et al., "Data augmentation for improving deep learning in image classification problem", IEEE International interdisciplinary PhD workshop, 2018, pp. 117-122.

Goodfellow et al, "Generative adversarial nets," NIPS, 2014, pp. 1-9.

Weiler, "2018: A Space Odyssey—How NASA uses Machine Learning for Space Exploration", Nov. 2018, pp. 1-4.

\* cited by examiner

MACHINE LEARNING MODEL DEVELOPMENT

TECHNOLOGICAL FIELD

The present disclosure relates generally to machine learning and, in particular, to machine learning model development.

BACKGROUND

Machine learning is a process to analyze data in which the dataset is used to determine a machine learning model (also called a rule or a function) that maps input data (also called independent, explanatory or predictor variables) to output data (also called dependent or response variables) according to a machine learning algorithm. A broad array of machine learning algorithms are available, with new algorithms the subject of active research. One type of machine learning is supervised learning in which a model is trained with a dataset including known output data for a sufficient number of input data. Once a model is trained, it may be deployed, i.e., applied to new input data to predict the expected output.

Machine learning may be applied to a number of different types of problems, such as classification problems in which the output data includes labels, classes, categories and the like. In some particular examples, machine learning may be applied in object detection problems to detect and classify (e.g., label) instances of objects depicted in digital images (including videos). Many successful uses of supervised learning rely on vast quantities of labeled training data to perform well. But the generation of this training data is often a very labor and cost intensive.

Therefore it would be desirable to have a system and method that takes into account at least some of the issues discussed above, as well as other possible issues.

BRIEF SUMMARY

Example implementations of the present disclosure are directed to machine learning model development and/or deployment in which training data may be produced in a less laborious and cost intensive manner than existing techniques. Example implementations generate training data by combining network inversion applied to a classification layer of an artificial neural network (ANN) classifier that is partially trained, and the decoder of an autoencoder or a generative adversarial network (GAN). This newly-generated, added training data may then be combined with an initial training dataset to further train the classification layer.

The present disclosure thus includes, without limitation, the following example implementations.

Some example implementations provide a method of machine learning model development, the method comprising building an autoencoder including an encoder trained to map an input into a latent representation, and a decoder trained to map the latent representation to a reconstruction of the input; building an artificial neural network classifier including the encoder of the autoencoder, and a classification layer partially trained to perform a classification in which one of a number of classes to which the input belongs is predicted based on the latent representation; applying neural network inversion to the classification layer to find inverted latent representations within a decision boundary between classes of the number of classes in which a result of the classification is ambiguous; obtaining inverted inputs from the inverted latent representations; labeling each inverted input of the inverted inputs with one of the number of classes that is its ground truth, and thereby producing added training data for the classification; and further training the classification layer using the added training data.

In some example implementations of the method of any preceding example implementation, or any combination of any preceding example implementations, the method further comprises training the classification layer with an initial training dataset to partially train the classification layer, wherein further training the classification layer includes producing an updated training dataset from the initial training dataset and the added training data, and further training the classification layer with the updated training dataset.

In some example implementations of the method of any preceding example implementation, or any combination of any preceding example implementations, obtaining the inverted inputs includes applying the inverted latent representations to the decoder of the autoencoder that maps the respective ones of the inverted latent representations to the inverted inputs.

In some example implementations of the method of any preceding example implementation, or any combination of any preceding example implementations, obtaining the inverted inputs includes applying the inverted latent representations to a generative adversarial network (GAN) that produces the inverted inputs from the respective ones of the inverted latent representations.

In some example implementations of the method of any preceding example implementation, or any combination of any preceding example implementations, the GAN includes a generative network and a discriminative network, and for each inverted latent representation from which an inverted input is obtained, the generative network generates candidate inverted inputs from the inverted latent representation, and the discriminative network evaluates the candidate inverted inputs based on a reference input, until the GAN converges on one of the candidate inverted inputs that is the inverted input obtained from the inverted latent representation.

In some example implementations of the method of any preceding example implementation, or any combination of any preceding example implementations, the input and inverted inputs are images, and the latent representation and inverted latent representations are feature vectors that describe features of the images.

In some example implementations of the method of any preceding example implementation, or any combination of any preceding example implementations, the method further comprises deploying the artificial neural network classifier including the classification layer further trained using the added training data, including receiving a new input image; and applying new input image to the artificial neural network classifier in which the encoder maps the new input image to a feature vector, and the classification layer predicts one of the number of classes to which the new input image belongs based on the feature vector.

Some example implementations provide an apparatus for machine learning model development. The apparatus comprises a memory configured to store computer-readable program code; and processing circuitry configured to access the memory, and execute the computer-readable program code to cause the apparatus to at least perform the method of any preceding example implementation, or any combination of any preceding example implementations.

Some example implementations provide a computer-readable storage medium for machine learning model development, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
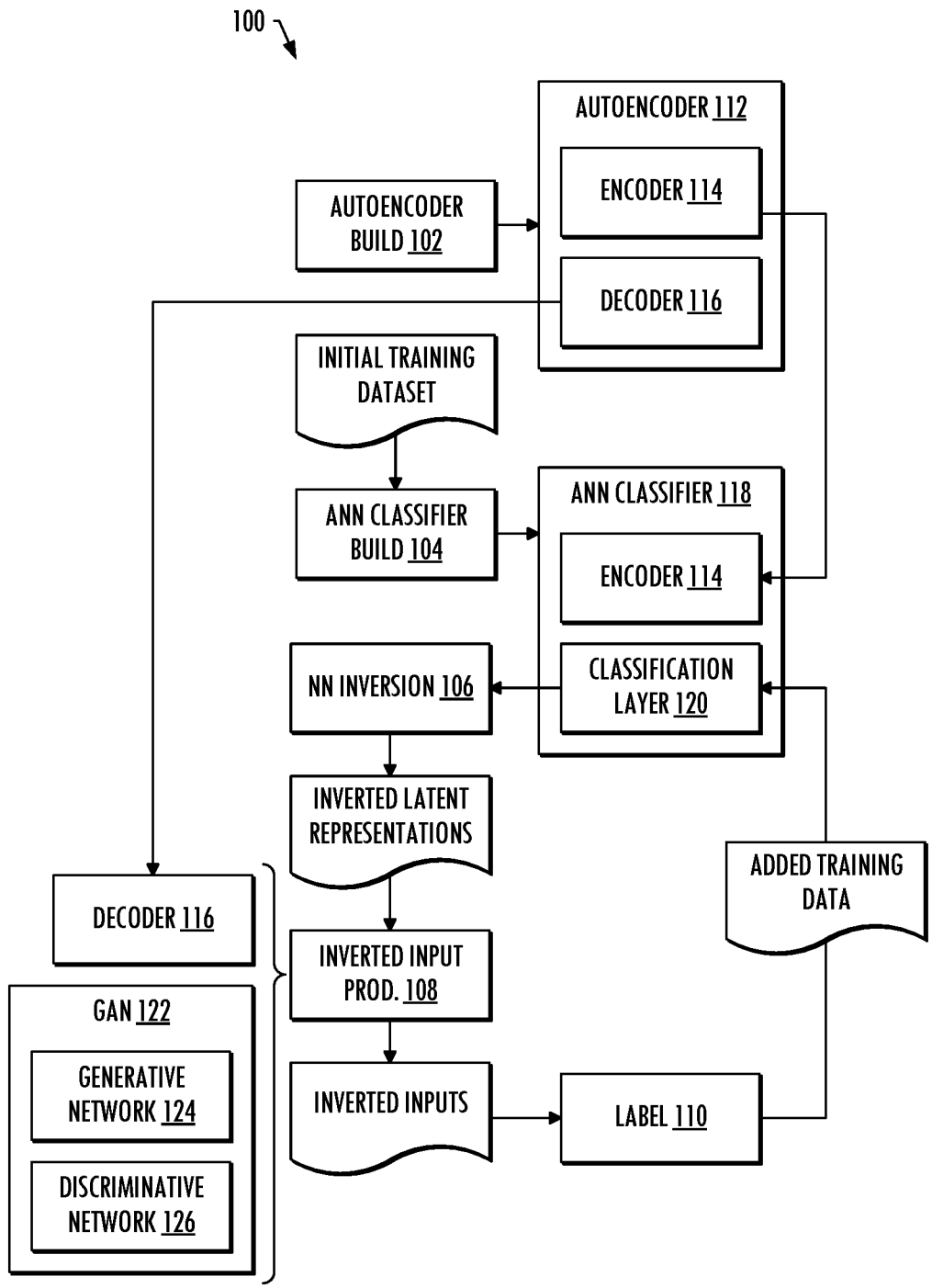
FIG. 1 illustrates a system for machine learning model development, according to example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure relate generally to machine learning and, in particular, to machine learning model development in which an artificial neural network classifier may be further trained with added training data. This added training data may be produced from a network inversion applied to the classification layer to find cases in which the result of the classification is ambiguous, which may then be labeled their ground truths. Example implementations enable development of high performance machine learning models—and in particular classifiers—models in a less laborious and cost intensive manner.

FIG. 1 illustrates a system 100 for machine learning model development, according to example implementations of the present disclosure. The system may include any of a number of different subsystems (each an individual system) for performing one or more functions or operations. As shown, in some examples, the system includes an autoencoder build module 102, an artificial neural network (ANN) classifier build module 104, a neural network (NN) inversion module 106, inverted input production module 108, and a label module 110.

The subsystems including the autoencoder build module 102, ANN classifier build module 104, NN inversion module 106, inverted input production module 108, and/or label module 110 may be co-located or directly coupled to one another, or in some examples, various ones of the subsystems may communicate with one another across one or more computer networks. Further, although shown as part of the system 100, it should be understood that any one or more of the above may function or operate as a separate system without regard to any of the other subsystems. It should also be understood that the system may include one or more additional or alternative subsystems than those shown in FIG. 1.

According to some example implementations of the present disclosure, the autoencoder build module 102 is configured to build an autoencoder 112 including an encoder 114 trained to map an input into a latent representation, and a decoder 116 trained to map the latent representation to a reconstruction of the input. One example of a suitable autoencoder is a deep convolutional autoencoder (CAE). One example of a suitable input is an image, and one example of a suitable latent representation is a feature vector that describe features of the image.

The ANN classifier build module 104 is configured to build an ANN classifier 118, which is a machine learning model applicable to classification problems. According to example implementations, the ANN classifier includes the encoder 114 of the autoencoder 112, and a classification layer 120 partially trained to perform a classification in which one of a number of classes to which the input belongs is predicted based on the latent representation. One particular example of a suitable ANN classifier is a multi-layer ANN classifier such as a deep convolutional neural network (CNN) classifier with a large number of layers. The NN inversion module 106 is configured to apply neural network inversion to the classification layer to find inverted latent representations within a decision boundary between classes of the number of classes in which a result of the classification is ambiguous. The decision boundary partitions the underlying problem space into two sets, one for each of the classes, and defines the region between the two sets in which the classifier is unable to classify an input (here inverted latent representations). The inverted input production module 108 is configured to obtain inverted inputs from the inverted latent representations. In some examples in which the input is an image and the latent representation is a feature vector that describes features of the image, the inverted inputs and inverted latent representations are likewise images and feature vectors that describe features of the images.

In some examples, the inverted input production module 108 is configured to apply the inverted latent representations to the decoder 116 of the autoencoder 112 that maps the respective ones of the inverted latent representations to the inverted inputs. Additionally or alternatively, in some examples, the inverted input production module is configured to apply the inverted latent representations to a generative adversarial network (GAN) 122 that produces the inverted inputs from the respective ones of the inverted latent representations. In some further examples, the GAN includes a generative network 124 and a discriminative network 126. In these further examples, for each inverted latent representation from which an inverted input is obtained, the generative network generates candidate inverted inputs from the inverted latent representation, and the discriminative network evaluates the candidate inverted inputs based on a reference input. And this generation and evaluation continues until the GAN converges on one of the candidate inverted inputs that is the inverted input obtained from the inverted latent representation.

The label module 110 is configured to label each inverted input of the inverted inputs with one of the number of classes that is its ground truth, and thereby produce added training data for the classification. The label module may label each inverted input automatically or responsive to user input, which may include the label module receiving the class or selection of the class with which the inverted input is labeled. The ANN classifier build module 104 is configured to further train the classification layer 120 of the ANN classifier 118 using the added training data. In some examples, the ANN classifier build module is configured to train the classification layer with an initial training dataset to partially train the classification layer. In some of these examples, the ANN classifier build module is configured to produce an updated training dataset from the initial training dataset and the added training data, and further train the classification layer with the updated training dataset.

To further illustrate development of the ANN classifier 118 according to example implementations of the present disclosure, consider the classification layer 120, partially trained, may predict a classification of an input. For example, given an email message, the partially-trained classification layer may predict whether the email message is "spam" (output value=1.0) or "not-spam" (output value=0.0). But for some email messages, the partially-trained classification layer may predict an output value=0.5, which is in the decision boundary between 1.0 and 0.0. That is, for some email messages, the partially-trained classification layer is unable to predict whether the email messages are spam or not-spam—the result of the classification is ambiguous. In these cases, the NN inversion module 106 of may apply neural network inversion to the classification layer to find inverted latent representations in which the result of the classification is 0.5. Or in some cases in which the decision boundary covers a range of results, say 0.4-0.6, the NN inversion module may apply neural network inversion to the classification layer to find inverted latent representations in which the result of the classification is within the range.

The inverted input production module 108 may obtain inverted inputs from these inverted latent representations, and the label module 110 may label each inverted input of the inverted inputs with one of the number of classes that is its ground truth, and thereby produce added training data for the classification. This labeling may clarify the classification of those cases in which the classification layer 120 is otherwise unable to predict the classification. The inverted inputs, as labeled, may then be used as added training data for the classification performed by the classification layer, improving performance of the classification.

Figure 2:
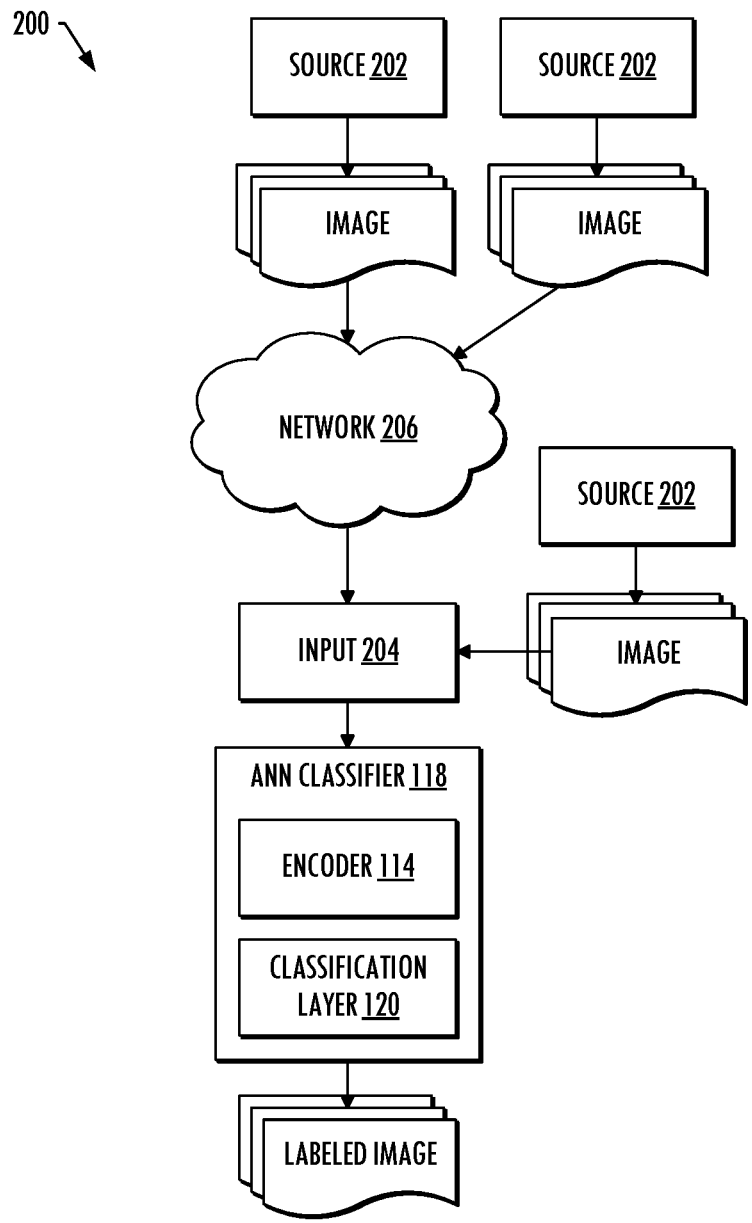
FIG. 2 illustrates a system for machine learning model deployment, according to example implementations.

FIG. 2 illustrates a system 200 for machine learning model deployment, according to example implementations. Although shown separate from the system 100 for machine learning model development, in some examples, the system for machine learning model development may further include the system for machine learning model deployment. Thus, the systems may be separate or integrated together. The system for machine learning model deployment will also be shown and described for examples in which the input and inverted inputs are images, and the latent representation and inverted latent representations are feature vectors that describe features of the images. It should be understood that the system may likewise be useful for other inputs and inverted inputs, as well as other latent and inverted latent representations.

The system 200 for machine learning model deployment may include any of a number of different subsystems (each an individual system) for performing one or more functions or operations. As shown, in some examples, the system includes at least one source 202 of images and an input 204, as well as the ANN classifier 118 developed using the system 100 of FIG. 1. As before, the subsystems including the source(s), input and ANN classifier may be co-located or directly coupled to one another, or in some examples, various ones of the subsystems may communicate with one another across one or more computer networks 206. Further, although shown as part of the system 200, it should be understood that any one or more of the above may function or operate as a separate system without regard to any of the other subsystems. It should also be understood that the system may include one or more additional or alternative subsystems than those shown in FIG. 2.

As described herein, a source 202 is a source of one or more images. In some examples, the source includes a memory that may be located at a single source or distributed across multiple sources. The image(s) may be stored in a number of different manners, such as in a database or flat files of any of a number of different types or formats.

The input 204 is configured to receive images from one or more sources 202, including a new input image to the ANN classifier 118. The input is configured to apply the new input image to the ANN classifier in which the encoder 114 maps the new input image to a feature vector, and the classification layer 120 predicts one of the number of classes to which the new input image belongs based on the feature vector. That is, the encoder is configured to map the new input image to the feature vector, and the classification layer is configured to predict one of the number of classes to which the new input image belongs based on the feature vector.

The ANN classifier 118 of example implementations may be applied to a number of different types of classification problems in which the output data includes labels, classes, categories and the like. In this regard, the ANN classifier may be applied in object detection problems to detect and classify (e.g., label) instances of objects depicted in digital images (including videos). This may be useful in a number of different applications. The ANN classifier may be useful for object detection onboard a manned or unmanned aircraft, artificial satellites, spacecraft and the like. Examples include the avionic systems for flight control systems, aerial positioning systems, autonomous take-off or landing systems, rendezvous and docking systems, and the like, in which the ANN classifier may be used to detect targets, obstacles, guides and the like.

The ANN classifier 118 may also be useful in inspection, survey and surveillance. For example, aircraft such as unmanned aerial vehicles (UAVs) or other remotely piloted vehicles, autonomous airborne vehicles or the like, may carry cameras for capturing aerial images for inspection, survey and surveillance in which the ANN classifier may be applied to detect and classify objects depicted in the images. In other examples, the ANN classifier may be useful in automatic surgical procedures, computer controlled medical devices, autonomous ground or maritime vehicles and functions. Still other examples include factory automation or inspection and repair systems. Another more recent examples include deep space exploration in which the ANN classifier may be deployed for galaxy morphological classification.

Figure 3:
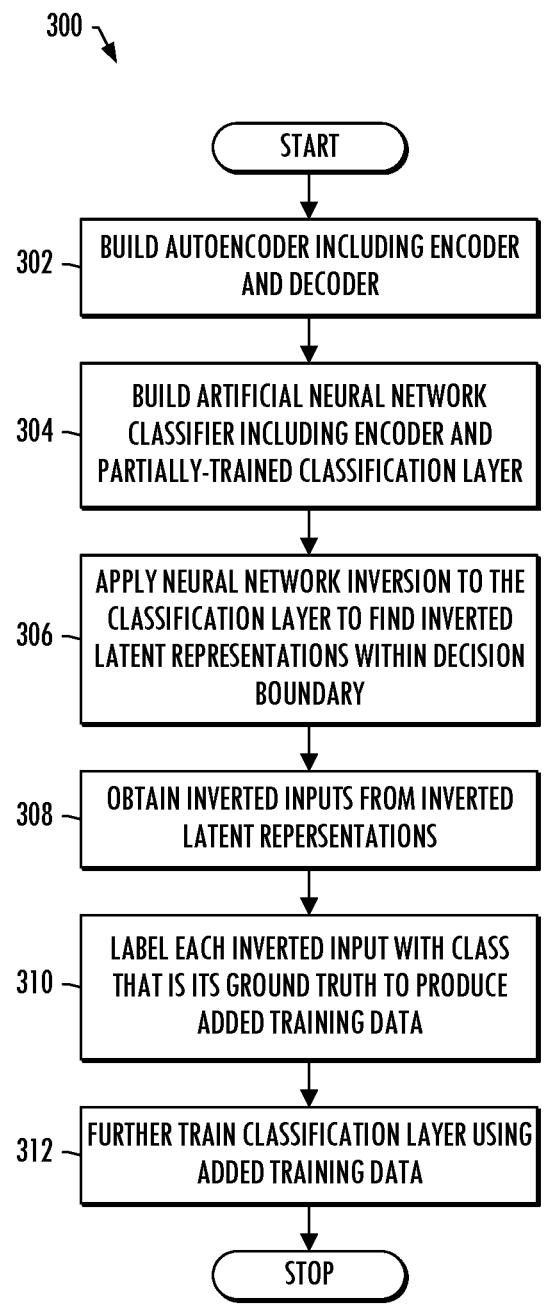
FIG. 3 is a flowchart illustrating various steps in a method of machine learning model development, according to example implementations.

FIG. 3 is a flowchart illustrating various steps in a method 300 of machine learning model development, according to example implementations of the present disclosure. As shown at block 302, the method includes building an autoencoder including an encoder trained to map an input into a latent representation, and a decoder trained to map the latent representation to a reconstruction of the input. The method includes building an artificial neural network classifier including the encoder of the autoencoder, and a classification layer partially trained to perform a classification in which one of a number of classes to which the input belongs is predicted based on the latent representation, as shown at block 304.

As shown at block 306, the method 300 includes applying neural network inversion to the classification layer to find inverted latent representations within a decision boundary between classes of the number of classes in which a result of the classification is ambiguous. The method includes obtaining inverted inputs from the inverted latent representations, such as by applying the inverted latent representations to the decoder of the autoencoder that maps the respective ones of the inverted latent representations to the inverted inputs, as shown at block 308. The method includes labeling each inverted input of the inverted inputs with one of the number of classes that is its ground truth, and thereby producing added training data for the classification, as shown at block 310. And the method includes further training the classification layer using the added training data, as shown at block 312.

According to example implementations of the present disclosure, the systems 100, 200 and their subsystems including the autoencoder build module 102, ANN classifier build module 104, NN inversion module 106, inverted input production module 108, label module 110, autoencoder 112, encoder 114, decoder 116, ANN classifier 118, classification layer 120, GAN 122, generative network 124, discriminative network 126, source 202 and/or input 204 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 4:
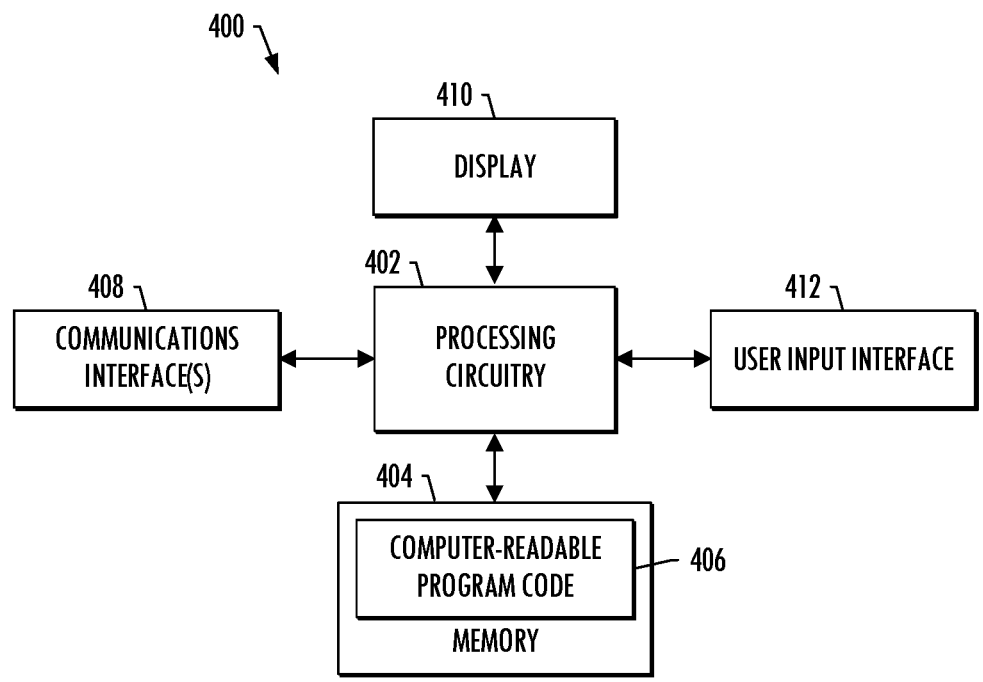
FIG. 4 illustrates an apparatus according to some example implementations.

FIG. 4 illustrates an apparatus 400 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 402 (e.g., processor unit) connected to a memory 404 (e.g., storage device).

The processing circuitry 402 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 404 (of the same or another apparatus).

The processing circuitry 402 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 404 is generally any piece of computer hardware that is capable of storing information such as, for example, data, computer programs (e.g., computer-readable program code 406) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 404, the processing circuitry 402 may also be connected to one or more interfaces for displaying, transmitting and/or receiving information. The interfaces may include a communications interface 408 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 410 and/or one or more user input interfaces 412 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 400 may include a processing circuitry 402 and a computer-readable storage medium or memory 404 coupled to the processing circuitry, where the processing circuitry is configured to execute computer-readable program code 406 stored in the memory. It will also be understood that one or more functions, and combinations of functions, may be implemented by special purpose hardware-based computer systems and/or processing circuitry which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for machine learning model development, the apparatus comprising:
   a memory configured to store computer-readable program code; and
   processing circuitry configured to access the memory, and execute the computer-readable program code to cause the apparatus to at least:
   build an autoencoder including an encoder trained to map an input into a latent representation, and a decoder trained to map the latent representation to a reconstruction of the input;
   build an artificial neural network classifier including the encoder of the autoencoder, and a classification layer partially trained to perform a classification in which one of a number of classes to which the input belongs is predicted based on the latent representation;
   apply neural network inversion to the classification layer to find inverted latent representations within a decision boundary between classes of the number of classes in which a result of the classification is ambiguous;
   obtain inverted inputs from the inverted latent representations;
   label each inverted input of the inverted inputs with one of the number of classes that is its ground truth, and thereby produce added training data for the classification; and
   further train the classification layer using the added training data.

2. The apparatus of claim 1, wherein the processing circuitry is configured to execute the computer-readable program code to cause the apparatus to further train the classification layer with an initial training dataset to partially train the classification layer,
  wherein the apparatus caused to further train the classification layer includes the apparatus caused to produce an updated training dataset from the initial training dataset and the added training data, and further train the classification layer with the updated training dataset.

3. The apparatus of claim 1, wherein the apparatus caused to obtain the inverted inputs includes the apparatus caused to apply the inverted latent representations to the decoder of the autoencoder that maps the respective ones of the inverted latent representations to the inverted inputs.

4. The apparatus of claim 1, wherein the apparatus caused to obtain the inverted inputs includes the apparatus caused to apply the inverted latent representations to a generative adversarial network (GAN) that produces the inverted inputs from the respective ones of the inverted latent representations.

5. The apparatus of claim 4, wherein the GAN includes a generative network and a discriminative network, and for each inverted latent representation from which an inverted input is obtained, the generative network generates candidate inverted inputs from the inverted latent representation, and the discriminative network evaluates the candidate inverted inputs based on a reference input, until the GAN converges on one of the candidate inverted inputs that is the inverted input obtained from the inverted latent representation.

6. The apparatus of claim 1, wherein the input and inverted inputs are images, and the latent representation and inverted latent representations are feature vectors that describe features of the images.

7. The apparatus of claim 6, wherein the processing circuitry is configured to execute the computer-readable program code to cause the apparatus to further deploy the artificial neural network classifier including the classification layer further trained using the added training data, including the apparatus caused to at least:
  receive a new input image; and
  apply new input image to the artificial neural network classifier in which the encoder maps the new input image to a feature vector, and the classification layer predicts one of the number of classes to which the new input image belongs based on the feature vector.

8. A method of machine learning model development, the method comprising:
  building an autoencoder including an encoder trained to map an input into a latent representation, and a decoder trained to map the latent representation to a reconstruction of the input;
  building an artificial neural network classifier including the encoder of the autoencoder, and a classification layer partially trained to perform a classification in which one of a number of classes to which the input belongs is predicted based on the latent representation;
  applying neural network inversion to the classification layer to find inverted latent representations within a decision boundary between classes of the number of classes in which a result of the classification is ambiguous;
  obtaining inverted inputs from the inverted latent representations;
  labeling each inverted input of the inverted inputs with one of the number of classes that is its ground truth, and thereby producing added training data for the classification; and
  further training the classification layer using the added training data.

9. The method of claim 8 further comprising training the classification layer with an initial training dataset to partially train the classification layer,
  wherein further training the classification layer includes producing an updated training dataset from the initial training dataset and the added training data, and further training the classification layer with the updated training dataset.

10. The method of claim 8, wherein obtaining the inverted inputs includes applying the inverted latent representations to the decoder of the autoencoder that maps the respective ones of the inverted latent representations to the inverted inputs.

11. The method of claim 8, wherein obtaining the inverted inputs includes applying the inverted latent representations to a generative adversarial network (GAN) that produces the inverted inputs from the respective ones of the inverted latent representations.

12. The method of claim 11, wherein the GAN includes a generative network and a discriminative network, and for each inverted latent representation from which an inverted input is obtained, the generative network generates candidate inverted inputs from the inverted latent representation, and the discriminative network evaluates the candidate inverted inputs based on a reference input, until the GAN converges on one of the candidate inverted inputs that is the inverted input obtained from the inverted latent representation.

13. The method of claim 8, wherein the input and inverted inputs are images, and the latent representation and inverted latent representations are feature vectors that describe features of the images.

14. The method of claim 13 further comprising deploying the artificial neural network classifier including the classification layer further trained using the added training data, including:
  receiving a new input image; and
  applying new input image to the artificial neural network classifier in which the encoder maps the new input image to a feature vector, and the classification layer predicts one of the number of classes to which the new input image belongs based on the feature vector.

15. A computer-readable storage medium for machine learning model development, the computer-readable storage medium being non-transitory and having computer-readable program code stored therein that, in response to execution by processing circuitry, causes an apparatus to at least:
  build an autoencoder including an encoder trained to map an input into a latent representation, and a decoder trained to map the latent representation to a reconstruction of the input;
  build an artificial neural network classifier including the encoder of the autoencoder, and a classification layer partially trained to perform a classification in which one of a number of classes to which the input belongs is predicted based on the latent representation;
  apply neural network inversion to the classification layer to find inverted latent representations within a decision boundary between classes of the number of classes in which a result of the classification is ambiguous;

obtain inverted inputs from the inverted latent representations;

label each inverted input of the inverted inputs with one of the number of classes that is its ground truth, and thereby produce added training data for the classification; and further train the classification layer using the added training data.

16. The computer-readable storage medium of claim 15, wherein the computer-readable storage medium has further computer-readable program code stored therein that, in response to execution by the processing circuitry, causes the apparatus to further train the classification layer with an initial training dataset to partially train the classification layer, wherein the apparatus caused to further train the classification layer includes the apparatus caused to produce an updated training dataset from the initial training dataset and the added training data, and further train the classification layer with the updated training dataset.

17. The computer-readable storage medium of claim 15, wherein the apparatus caused to obtain the inverted inputs includes the apparatus caused to apply the inverted latent representations to the decoder of the autoencoder that maps the respective ones of the inverted latent representations to the inverted inputs.

18. The computer-readable storage medium of claim 15, wherein the apparatus caused to obtain the inverted inputs includes the apparatus caused to apply the inverted latent representations to a generative adversarial network (GAN) that produces the inverted inputs from the respective ones of the inverted latent representations.

19. The computer-readable storage medium of claim 18, wherein the GAN includes a generative network and a discriminative network, and for each inverted latent representation from which an inverted input is obtained, the generative network generates candidate inverted inputs from the inverted latent representation, and the discriminative network evaluates the candidate inverted inputs based on a reference input, until the GAN converges on one of the candidate inverted inputs that is the inverted input obtained from the inverted latent representation.

20. The computer-readable storage medium of claim 15, wherein the input and inverted inputs are images, and the latent representation and inverted latent representations are feature vectors that describe features of the images.

21. The computer-readable storage medium of claim 20, wherein the computer-readable storage medium has further computer-readable program code stored therein that, in response to execution by the processing circuitry, causes the apparatus to further deploy the artificial neural network classifier including the classification layer further trained using the added training data, including the apparatus caused to at least:

receive a new input image; and apply new input image to the artificial neural network classifier in which the encoder maps the new input image to a feature vector, and the classification layer predicts one of the number of classes to which the new input image belongs based on the feature vector.

* * * * *